US006219085B1

United States Patent
Hanna

(10) Patent No.: US 6,219,085 B1
(45) Date of Patent: Apr. 17, 2001

(54) METHOD AND SYSTEM FOR IMPROVED PERFORMANCE OF ADJUSTABLE PRINTER CLOCKS IN AN ELECTROPHOTOGRAPHIC DEVICE

(75) Inventor: Stephen Dale Hanna, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/176,649

(22) Filed: Oct. 21, 1998

(51) Int. Cl.[7] ................................................... B41J 2/435
(52) U.S. Cl. .................... 347/249; 347/248; 347/250; 347/235
(58) Field of Search ..................................... 347/234, 235, 347/237, 247, 248, 250, 116, 133, 249; 348/537; 358/500, 409, 410, 494; 331/1 A

(56) References Cited

U.S. PATENT DOCUMENTS

| 4,872,065 | * | 10/1989 | Isono et al. ........................... 358/494 |
| 5,081,477 | * | 1/1992 | Gibson ................................. 347/133 |
| 5,612,792 | * | 3/1997 | Ichikawa et al. ..................... 358/500 |
| 5,668,504 | * | 9/1997 | Rodriques Ramalho ............ 331/1 A |
| 5,940,136 | * | 8/1999 | Abe et al. ............................. 348/537 |

* cited by examiner

Primary Examiner—N. Le
Assistant Examiner—Hai C. Pham
(74) Attorney, Agent, or Firm—Monica D. Lee; Felsman, Bradley, Vaden, Gunter & Dillon, LLP

(57) ABSTRACT

A method and system are disclosed for improving performance of adjustable printer clock signals in an electrophotographic device. A source clock signal is output having a source frequency. A first clock signal is output having a first frequency. The first frequency is substantially related to the source frequency by a ratio of $n_1:m_1$. An alignment signal is generated for adjusting a first printer clock signal with respect to a second printer clock signal. In response to the first clock signal and the alignment signal, the first printer clock signal is output having a first printer frequency. The first printer frequency is substantially related to the source clock frequency by a ratio of $n_1n_2:m_1m_2$.

28 Claims, 6 Drawing Sheets

METHOD AND SYSTEM FOR IMPROVED PERFORMANCE OF ADJUSTABLE PRINTER CLOCKS IN AN ELECTROPHOTOGRAPHIC DEVICE

RELATED PATENT APPLICATION

The present patent application is related to a copending application U.S. Ser. No. 09/024,476 filed on Feb. 17, 1998, entitled "METHOD AND SYSTEM FOR THE MODIFICATION OF THE TIMING OF A PLURALITY OF PEL CLOCKS IN AN ELECTROPHOTOGRAPHIC DEVICE".

BACKGROUND OF THE INVENTION

1. Technical Field

The present invention relates to data processing systems and, in particular, to electrophotographic reproduction devices. Still more particularly, the present invention relates to improving performance of adjustable printer clocks in an electrophotographic reproduction device.

2. Description of the Related Art

Electrophotographic reproduction devices can generally be divided into copiers or printers. The present invention relates primarily to printers.

In an electrophotographic printer, a charged photoconductor is selectively discharged by the operation of a print or imaging station, to provide an electrostatic latent image on the photoconductor's surface. This latent image corresponds to the visual image that is to be printed, first by applying toner to the photoconductor, and then by transferring the toner image to the surface of substrate material such as a sheet of plain paper.

Electrophotographic reproduction devices may be constructed to apply toner to either the photoconductor's discharged area, or to the photoconductor's charged area. The former type of device is called a discharged area developing device, whereas the latter device is called a charged area developing device.

The broad spirit and scope of the invention are not to be limited to a scanning light beam since, as will be appreciated by those of skill in the art, such a scanning beam generally comprises a moving point or spot of light, that can be modulated in intensity—for example, on and off, to form an electrostatic latent image on the photoconductor.

Thus, the term scanning laser beam, as used herein, is intended to mean any moving point of light to which the photoconductor is sensitive, and which operates to sequentially print the small picture elements, or PELs, of one or more image rows, as the point of light sequentially scans the photoconductor, image row after image row.

In printers of this type, the image to be printed comprises an electronic image signal that may, for example, reside in the page memory of a data processing system. In this page memory, each photoconductor PEL area that is to be discharged may, again by way of example, be represented by a binary "1", in which case each PEL this is to be left in its charged state would be represented by a binary "0". As the spot of light moves across a photoconductor PEL row, the row content of the page memory signal is gated utilizing a PEL clock to control or modulate the spot of light in accurate synchronism with the position of the moving spot of light.

The art has recognized the need to synchronize the gating of the print data signal to laser beam modulator means as a function of the beam's position prior to each photoconductor scan. For example, it is known to use a photosensor that is located on an image plane that is established by the physical location of the photoconductor. As a result of the detection of the laser beam at this start of scan position, a timing pulse, or beam detection indicator, is generated to start the flow of print data to a beam modulator.

Imaging stations used in electrophotographic printers often utilize more than one scanning laser beam. In systems utilizing two beams, for example, each beam scans a different PEL row approximately concurrently so that two PEL rows are simultaneously scanned. Therefore, two beam detection indicators are generated, one for each beam. A fixed time offset between a first pel of a first beam and a first pel of a second beam may be equivalent to an offset of several tens of pels on order to avoid interference between the adjacent beams.

Print quality is at least partially determined by the sensitivity of the printer to adjustments and/or modifications to the print start location of each beam, as well as to the size and length of a PEL. For duplex printers, adjustments and/or modifications may need to be made to the print start location of each beam, and size and length of a PEL to compensate for paper shrinkage which occurs after printing the front size of the duplex-printed page.

Therefore a need exists for a method and system in an electrophotographic reproduction devices for improving performance of adjustable printer clocks.

SUMMARY OF THE INVENTION

It is therefore one object of the present invention to provide an improved data processing system.

It is another object of the present invention to provide an improved electrophotographic reproduction device.

It is yet another object of the present invention to provide a method and system in an electrophotographic reproduction device for improving performance of adjustable printer clocks.

The foregoing objects are achieved as is now described. A method and system are disclosed for improving performance of adjustable printer clock signals in an electrophotographic device. A source clock signal is output having a source frequency. A first clock signal is output having a first frequency. The first frequency is substantially related to the source frequency by a ratio of $n_1:m_1$. An alignment signal is generated for adjusting a first printer clock signal with respect to a second printer clock signal. In response to the first clock signal and the alignment signal, the first printer clock signal is output having a first printer frequency. The first printer frequency is substantially related to the source clock frequency by a ratio of $n_1 n_2 : m_1 m_2$.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

Figure 1:
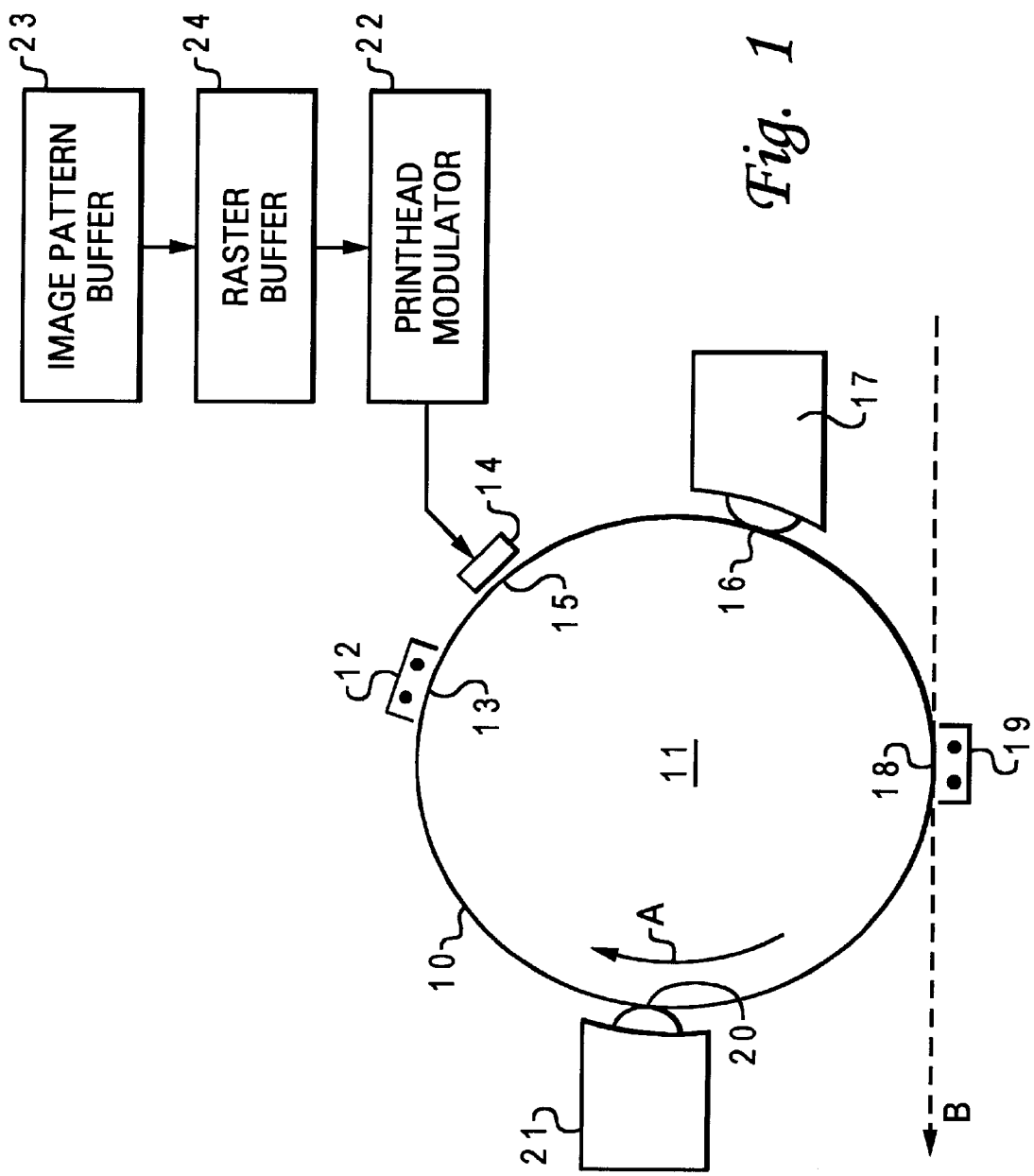
FIG. 1 depicts a pictorial representation of an electrophotographic printer embodying the present invention.

A preferred embodiment of the present invention and its advantages are better understood by referring to FIGS. 1–6 of the drawings, like numerals being used for like and corresponding parts of the accompanying drawings.

This invention will be illustrated within the framework of electrophotographic devices wherein prints are produced by sequentially creating an image of the print subject on a photoconductor surface, developing the image with toner, transferring the toner image to print receiving material, and then fusing the toner image to the print receiving material. In most electrophotographic machines, the electrophotographic process is of the transfer type, wherein photoconductor material is placed around a rotating drum, or is arranged as a belt to be driven by a system of rollers. In a typical transfer process, photoconductor material is passed under a stationary charge generating station, to thereby place a relatively uniform electrostatic charge, usually several hundred volts, across the entirety of the photoconductor surface. Next, the photoconductor is moved to an imaging station where the photoconductor receives light rays from a light-generating source. These light rays discharge the photoconductor to relatively low levels when the light source is fully powered, while the photoconductor continues to carry high voltage levels when the light source is turned off, or when it is powered at intermediate levels, or for a relatively short time duration. In that manner, the photoconductor is caused to bear an electrostatic latent charge pattern which corresponds to the printing, shading, etc., which is desired to be printed on the receiving material.

Light-generating sources in an electrophotographic printer frequently comprise lasing means in which a laser beam is modulated by a character generator and a modulator to control the power or length of time that the beam exposes the photoconductor in each particular picture element (PEL) area. In a multiple beam lasing system, multiple modulating means modulates more than one beam at a time so that multiple lines or rows of PELs are written at a time.

The present invention is described in a two-beam system. However, those skilled in the art will recognize that any greater number of beams may be utilized. For example, in a four-beam system, the method and system described below for adjusting one beam with respect to another is expanded so that any of the four beams may be adjusted with respect to any of the other beams.

After producing a latent image on the photoconductor, the latent image is moved to a developing station where developing material called toner is placed on the image. Toner is usually in the form of a colored powder which carries a charge designed to cause the powder to deposit on selected areas of the photoconductor.

The developed image is then moved from the developing station to a transfer station where copy receiving material, usually paper, is juxtaposed to the developed toner image, as a charge is placed on the backside of the paper, so that when the paper is thereafter stripped from the photoconductor, a toner image is held on the paper's surface as toner is concomitantly removed from the photoconductor.

The remaining electrophotographic process steps provide permanent bonding or fusing of the toner to the copy paper, and cleaning of residual toner from the photoconductor so that the photoconductor can be reused.

FIG. 1 depicts a electrophotographic printer incorporating this invention. Photoconductor material 10 is placed on the surface of a drum 11 which is driven by motive means, not shown, to rotate at a substantially constant speed in the direction A. A charge generator 12 places a uniform charge of several hundred volts across the surface of photoconductor 10 at the location of charging station 13. The charged photoconductor is mounted in a dark enclosure, not shown, and thereafter rotates to the location of a printhead 14 which is comprised of a light-generating source, such as the laser beam generator shown in FIG. 2.

Printhead 14 selectively exposes the charged photoconductor to light as the photoconductor passes through imaging station 15. As a result, imaging station 15 operates to discharge photoconductor 10 in areas which are desired to be developed with toner (Discharged Area Development, DAD process), or to discharge the photoconductor in areas which are to remain free of toner (Charged Area Development, CAD process).

For a DAD process, the discharged areas of photoconductor 10 are developed at developing station 16 by developer apparatus 17 which operates to apply toner so that the photoconductor thereafter carries a visually perceptible image of the print data that previously operated to control printhead 14. In a CAD process, the charged areas are developed. In either case, the developed image now rotates to transfer station 18 whereat print paper, moving in the direction B, is juxtaposed with the surface of photoconductor 10. A charge opposite in polarity to the charge on the toner is placed on the backside of the print paper by transfer charge generator 19, such that when the paper is stripped from the surface of the photoconductor, toner is attracted to the paper and leaves the surface of photoconductor 10. Any remaining residual toner is cleaned from the photoconductor at cleaning station 20 by operation of cleaning apparatus 21.

The selective application of light rays to photoconductor 10 at imaging station 15 is accomplished through operation of printhead modulator means 22. For a semiconductor laser diode, printhead modulator 22 may be comprised of a power supply, which will either turn the light source on for longer or shorter periods of time to accomplish varying degrees of photoconductor discharge, in accordance with image pattern data, or modulator 22 will turn the light-generating source on to a greater or lesser illumination intensity in accordance with that data. In any event, modulation will occur in accordance with the data contained in buffer memory 23. Print data is first sent to a raster buffer 24, and then to printhead modulator 22, as is well known by those skilled in the art.

Figure 2:
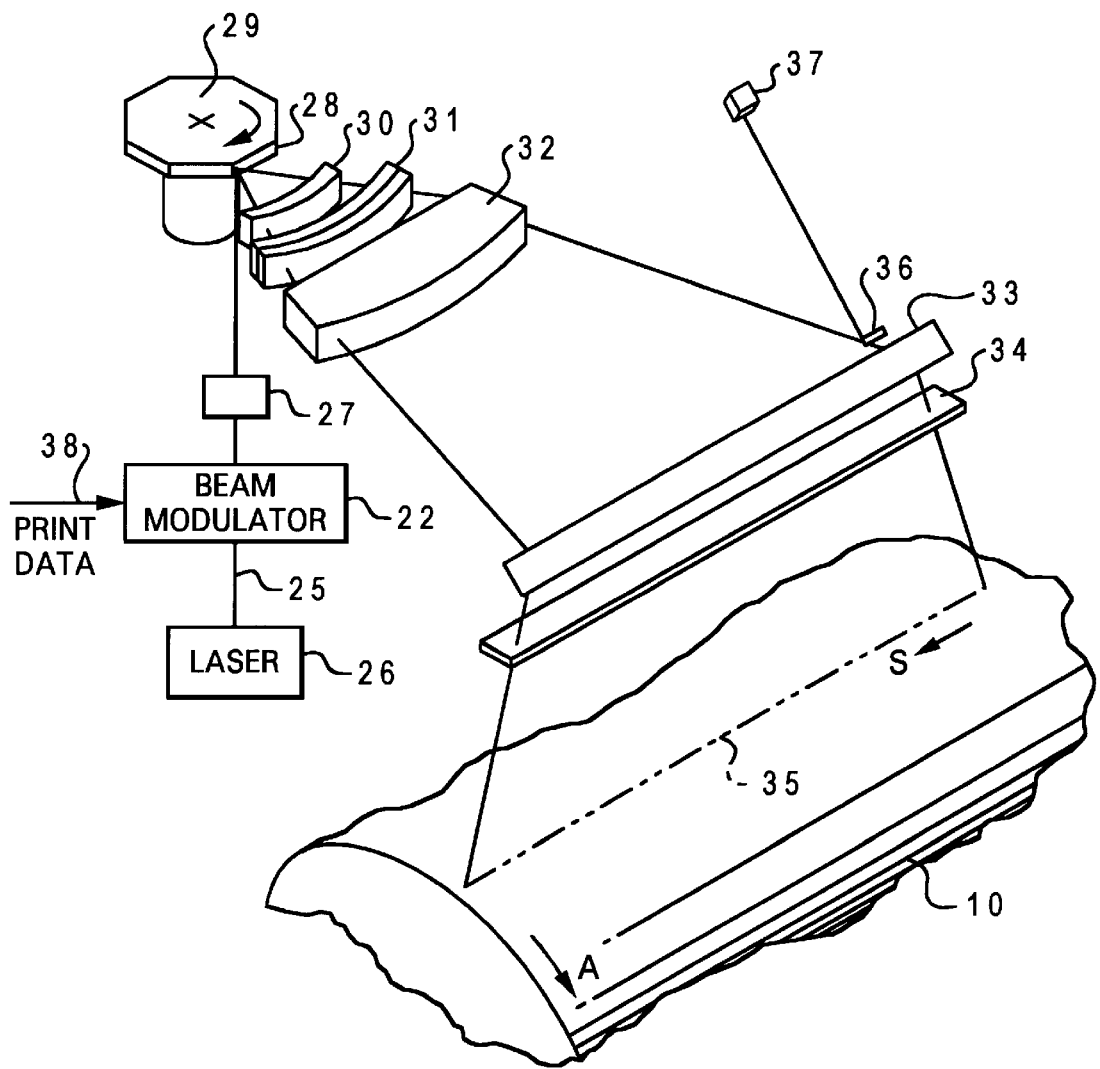
FIG. 2 illustrates a pictorial representation of a scanning laser imaging station of the printer of FIG. 1 in accordance with the method and system of the present invention.

FIG. 2 illustrates an optical scanning system which can be used as printhead 14 of FIG. 1. In FIG. 2, a laser beam 25 is shown emanating from laser module 26. Beam 25 passes through beam modulator 22 and then through cylindrical lens 27 for focusing the beam onto the facets 28 of a rotating polygon mirror 29. The beam is reflected from the moving mirror facets, and then through a negative spherical lens group 30, an anamorphic lens group 31, and a positive spherical lens group 32, to the surface of photoconductor 10. FIG. 2 also depicts a fold mirror 33, and exit window 34, and the length of the scan 35 across photoconductor 10.

A reflective surface 36 is provided to reflect light from the laser beam to a photo-detector means 37. Means 37 provides a start of scan, beam detection indicator.

As the laser beam traverses photoconductor scan line 35 while moving at a substantially constant speed during the formation of one PEL row of a print data image, the binary print image signal present on conductor 38 may operate to control modulator 22 to an on or off state for each image PEL that is to be printed. The phase at which modulator 22 is controlled during each scan line 35 must be such that the PELs of one scan row will align with the corresponding PELs of adjacent scan rows.

Figure 3A:
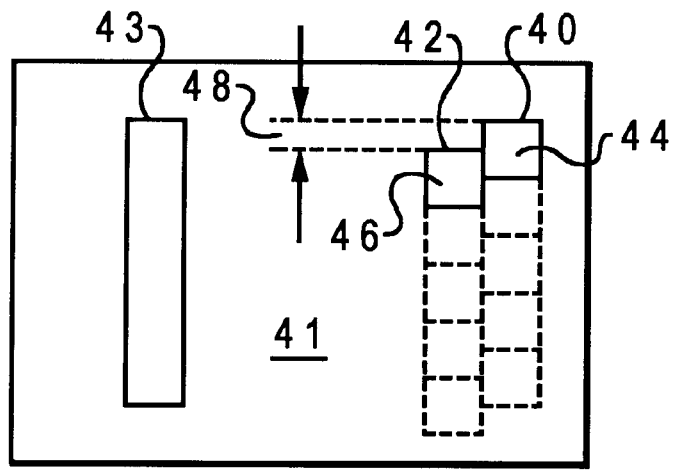
FIGS. 3A and 3B illustrate a pictorial representation of a print receiving material, such as paper, two "printed" PEL rows of an image, and a printed measurement device in accordance with the method and system of the present invention.
Figure 3B:
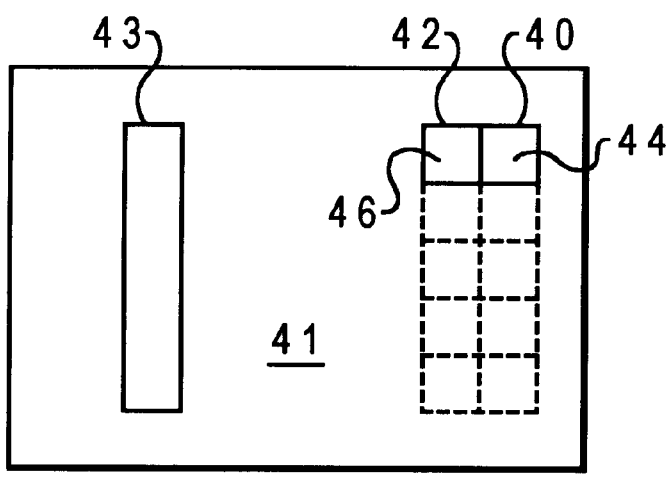

FIGS. 3A and 3B illustrate a pictorial representation of a print receiving material, such as paper, two "printed" PEL rows of an image printed on a print receiving material 41, such as paper, and a printed measurement device in accordance with the method and system of the present invention. A first PEL row 40 is generated in response to a first beam detect indicator during a first scan where a first beam is synchronized by a first PEL clock. A second PEL row 42 is generated in response to a second beam detect indicator during a second scan where a second beam is synchronized by a second PEL clock. As shown in FIG. 3A, prior to adjusting the timing of the PEL clocks by adjusting the timing of the second beam with respect to the timing of the first beam, the positions of PELs 44 and 46 are not aligned.

In addition, a printed measurement device 43, such as a ruler, is also printed on paper 41. Ruler 43 may be utilized to determine a start print location for a first PEL, as well as PEL size and length. In a preferred embodiment, the length of the ruler is the length of multiple PELs. A user may modify or adjust PEL size by inputting parameters into the printer which causes ruler 43 to be lengthened or shortened. The user may also cause ruler 43 to be moved on the paper in order to position the start print position at a new location.

This is useful particularly in duplex printers. In duplex printers, one ruler 43 is printed on a front of paper 41 and a second ruler 43 is printed on a back of paper 41. A user may compare the position and length of the two rulers to align them so that printing on the back of the paper will be aligned with printing on the front.

When the position of ruler 43 is moved, an offset from its original position is created. When ruler 43 is lengthened or shortened, an offset from its original length is created. These offsets are utilized as described below to modify the printer clocks in order to print ruler 43 in its modified position with its modified length.

In addition to permitting an adjustment to the length and position of ruler 43, and thus to a first printed PEL, the placement of multiple PEL lines may be adjusted with respect to each other. In order to adjust the placement of the PELs of concurrent scans at the desired linear positional relationship with respect to each other, the timing of the second beam is adjusted with respect to the timing of the first beam. In this manner, the second scan can be adjusted, and therefore, the physical position of the PEL row may be adjusted with either a positive or negative delay, with respect to the first scan. As shown in FIG. 3B after adjusting the timing of the second beam with respect to the timing of the first beam utilizing an offset 48 of the position of one PEL from a second PEL, the positions of PELs 44 and 46 are aligned.

Figure 4:
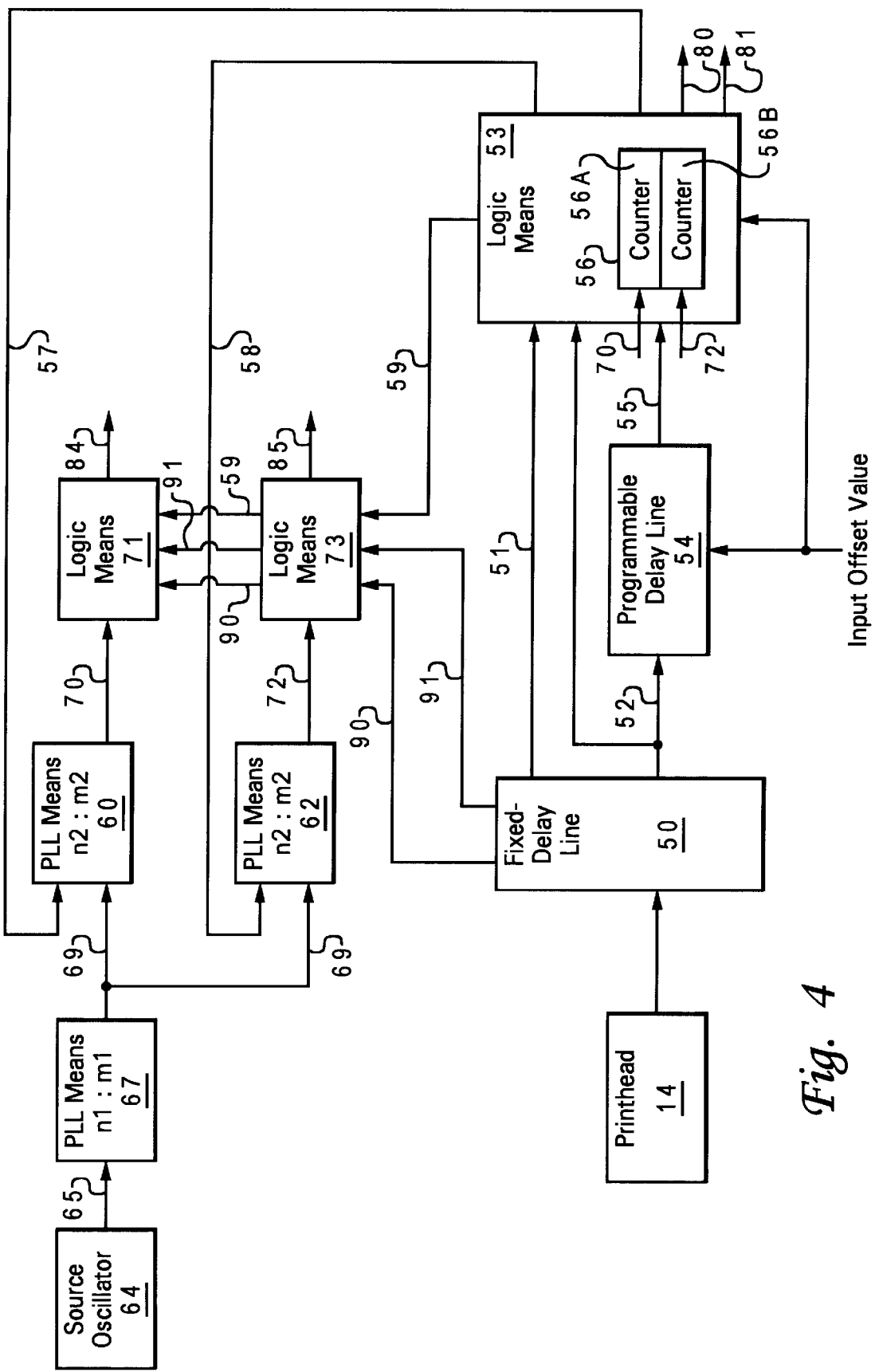
FIG. 4 is a block diagram of a circuit for generating a plurality of PEL reduced-jitter clocks where the timing of each of the clocks is finely adjustable in accordance with the method and system of the present invention.

FIG. 4 is a block diagram of a circuit for generating a plurality of PEL reduced jitter clocks where the timing of each of the clocks is finely adjustable in accordance with the method and system of the present invention. Printhead 14 generates a plurality of beam detect indicators, one for each beam utilized by the printer. These beam detect indicators may be included either as two separate timing pulses in a single signal, or each as a timing pulse in a separate signal. In the preferred embodiment, the two pulses are included in a single signal. A beam detect signal including the two beam detect pulses is received by a fixed delay line 50 which generates signals 51, 52, 90, and 91. Signal 51 is the beam detect signal which includes no delay. Signal 52 is the beam detect signal including preferably a 125 nsec delay. Those skilled in the art will recognize that by a selection of different circuitry components, a different delay may be utilized in order to produce the same result. Other signals having a different amount of delay may be generated from delay line 50 as needed.

The first beam detect signal 51 is input directly into logic means 53. The second beam detect signal 52 is delayed by programmable delay line 54. The amount of the programmable delay is determined utilizing an offset adjustment value entered by a user. Prior to initiating a print operation, a user selects an adjustment, or offset, value. The offset value is an amount by which a physical position for a first PEL in a second PEL row is offset from a physical position for a first PEL in a first PEL row as shown in FIG. 3A. The offset is the number of PELs by which the second row is offset from the first. The offset may include both an integer number of PELs as well as a fractional amount of a PEL. The programmable delay line 54 adds a delay equivalent to the fractional amount of the offset to second signal 52. A beam detect adjustment signal 55 is generated from programmable delay line 54 and is equal to signal 52 delayed a fractional PEL amount. In this manner, signal 55 is adjusted with respect to signal 51 and includes the fractional PEL offset.

Logic means 53 receives as input signals 51 and 52. Logic means 53 and counting means 56 generate PEL clock enable signals 57 and 58, and signals 80 and 81. Signals 57 and 58 are beam alignment adjustment signals. A between beam detect signal 59 is also generated by logic means 53. PEL clock enable signal 57 is associated with first PEL row 40. PEL row 40 is generated by a first scan which is synchronized by a first PEL clock 70. The first scan is initiated in response to PEL clock enable signal 57. PEL clock enable signal 58 is associated with second PEL row 42. PEL row 42 is generated by a second scan which is synchronized by a second PEL clock 72. The second scan is initiated in response to PEL clock enable signal 58.

PEL clock enable signal 57 is generated in accordance with the following logical equation: Signal 57=Signal 51+/Signal 52+/Signal 59. Signal 59 is generated utilizing signal 55. Signal 59 becomes a logical "1" at the falling edge of the first pulse of signal 55, and becomes a logical "0" at the falling edge of the second pulse of signal 55. PEL clock enable signal 58 is generated in accordance with the following logical equation: Signal 58=Signal 51+/Signal 55+Signal 59. In this manner, signal 58, which is associated with the second scan, is offset with respect to signal 57, which is associated with a first scan. The offset includes the fractional PEL amount.

Signals 70 and 72 are used to run two separate counters, 56A and 56B, that implement the full pel offset adjustment. In general, all scans are delayed by some integer number pels. If scan 2 is delayed less than scan 1, this amounts to a negative adjustment to scan 2. In the preferred embodiment, scan 1 is delayed a fixed amount of 8 pels and scan 2 delayed by 0 to 15 pels for a −8 to +7 pel adjustment window. This saves register space and logic in a two beam implementation, but a more general implementation would make all delays adjustable. As each counter reaches its target count, it outputs a START signal 80, 81 that is synchronous with the adjusted pel clock The START signals are reset during the first 25 nsec of signal 51.

Signals 57 and 58 are received by phase-locked-loop means 60 and 62, respectively. Frequency oscillator 64 outputs a source clock signal 65 having a source frequency and provides it as an input to a PLL 67. Phase-locked-loop 67 outputs a first clock signal 69 having a first frequency and provides it as an input to both PLLs 60 and 62. Those skilled in the art will recognize that an additional PLL is added for each additional beam in system 10 which receives as an input a beam alignment signal and clock signal 69.

Phase-locked-loop 67 receives source clock signal 65 and generates clock signal 69. The frequency of signal 69 is substantially related to the frequency of signal 65 by a ratio of $n_1:m_1$. Phase-locked-loop 60 receives clock signal 69 and generates printer clock signal 70 having a first printer frequency. The frequency of signal 70 is substantially related to the frequency of signal 69 by a ratio of $n_2:m_2$. Therefore, the frequency of signal 70 is substantially related to the frequency of signal 65 by a ratio of $n_1n_2:m_1m_2$. Similarly, phase-locked-loop 62 receives clock signal 69 and generates printer clock signal 72 having a second printer frequency. The frequency of signal 72 is substantially related to the frequency of signal 69 by a ratio of $n_2:m_2$. Therefore, the frequency of signal 72 is substantially related to the frequency of signal 65 by a ratio of $n_1n_2:m_1m_2$. By utilizing PLL 67, jitter in PLL's 60 and 62 may be reduced.

Phase-locked-loops 60 and 62, act as programmable oscillators. PLL 60, generates PEL clock 70 in response to PEL clock enable signal 57. PLL 62 generates PEL clock 72 in response to PEL clock enable signal 58. PEL clock 72, therefore, is delayed with respect to PEL clock 70 in order to align the positions of the first PELs in PEL rows 40 and 42 as desired in accordance with the user input offset.

Logic means 71 receives PEL clock 70 as well as signals 59, 90, and 91. Logic means 71 generates signal 84. Logic means 73 receives PEL clock 72 as well as signals 59, 90, and 91. Logic means 73 generates signal 85.

Figure 5:
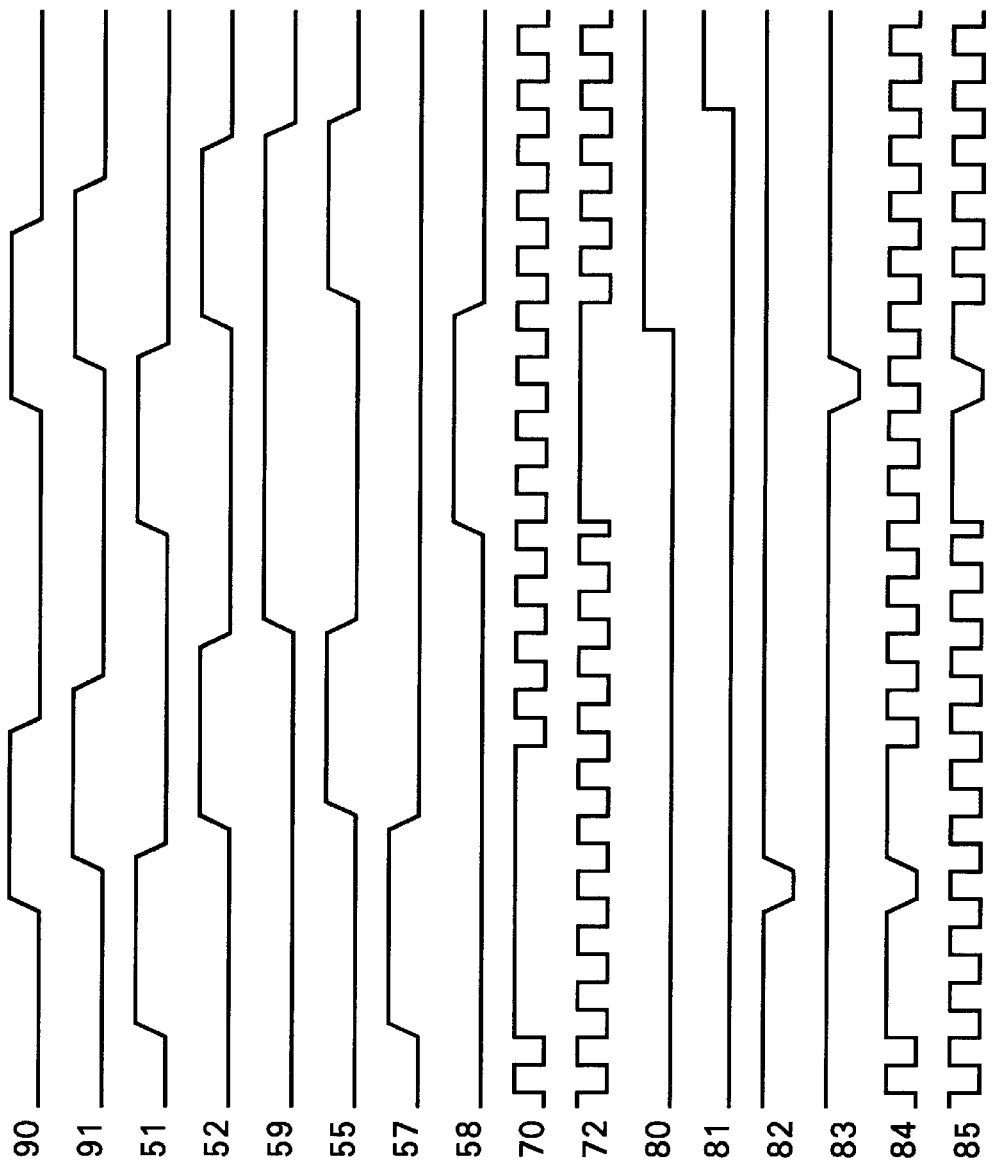
FIG. 5 is a timing diagram of selected signals generated by the device of FIG. 4 in accordance with the method and system of the present invention.

FIG. 5 is a timing diagram of selected signals generated by the device of FIG. 4 in accordance with the method and system of the present invention. As depicted in FIG. 5, signals 57 and 58 include the partial PEL offset value.

START signal 80 occurs on the eighth rising edge of signal 70. START signal 81 occurs on the 0 to 15th rising edge of signal 72. As depicted in FIG. 5, signal 80 occurs on the fourth edge relative to signal 70, thus causing a negative adjustment relative to signal 70. Signal 82 is added to signal 70 to do early set up of drivers. Signal 82=(Pulse Beam Detect Signal+7 nsec)*/(Pulse Beam Detect Signal+100 nsec)*/Signal 59. Signal 83=(Pulse Beam Detect Signal+7 nsec)*(Pulse Beam Detect Signal+100 nsec) * Signal 59. Signal 90=pulse beam detect signal delayed 75 nsec. Signal 91=pulse beam detect signal delayed 100 nsec.

Signals 84 and 85 are then the resultant PEL clocks where signal 85 is than delayed by either a positive or negative adjustable amount from signal 84.

Figure 6:
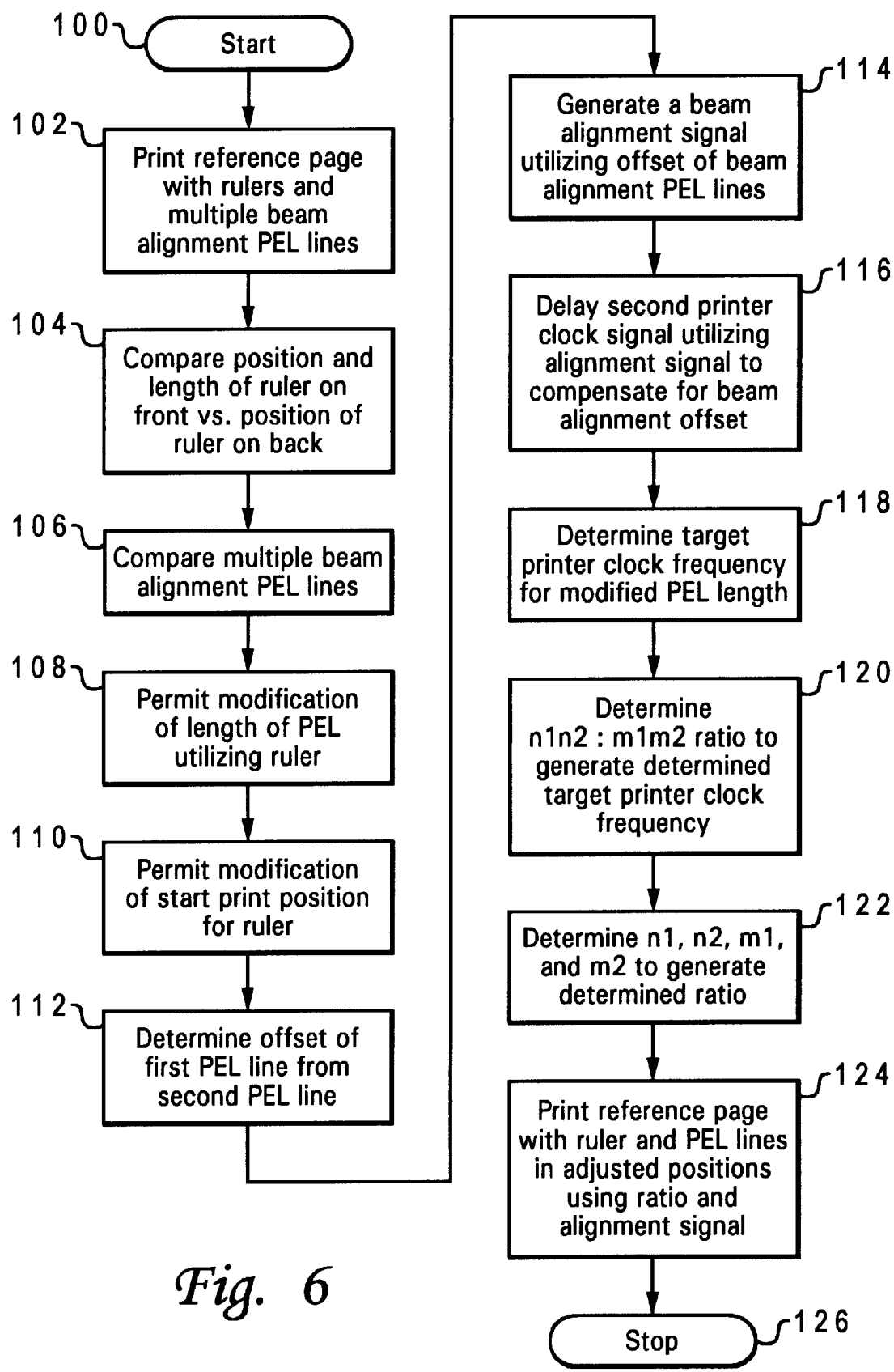
FIG. 6 is a high level flow chart illustrating the printing of PELs utilizing finely adjustable printer clock signals in accordance with the method and system of the present invention.

FIG. 6 is a high level flow chart illustrating the printing of PELs utilizing finely adjustable printer clock signals in accordance with the method and system of the present invention. The process starts as depicted at block 100 and thereafter passes to block 102 which illustrates the printing of a reference page which has a ruler printed on both the front and back sides of the page. Multiple beam alignment PEL lines are also printed on the page. Next, block 104 depicts the comparing of the position and length of the ruler printed on the front of the page against the position of the ruler printed on the back of the page. The process then passes to block 106 which illustrates the comparing of one of the beam alignment PEL lines against another beam alignment PEL line. Next, block 108 depicts the permitting of a modification of the length of a PEL by receiving a modification to the length of the reference ruler. Thereafter, block 110 illustrates the permitting of a modification of a start print position by receiving a modification to a print position of the reference ruler.

The process then passes to block 112 which depicts a determination of an offset of a first beam alignment PEL line from a second beam alignment PEL line. Thereafter, block 114 illustrates a generation of a beam alignment signal utilizing the offset as described above. Next, block 116 depicts the delaying of the second printer clock signal as described above utilizing the alignment signal to compensate for the beam alignment offset. The process then passes to block 118 which illustrates a determination of a target printer clock frequency. Block 120, then, depicts a determination of a ratio, $n_1n_2:m_1m_2$, to utilize in order to modify oscillator frequency to be equal to the desired target printer clock frequency. Next, block 122 illustrates a determination of $n_1$, $n_2$, $m_1$, and $m_2$ to generate the determined ratio. The values for $n_1$, $n_2$, $m_1$, and $m_2$ may be selected to further customize the device 10. For example, the values could be chosen to maintain a low frequency difference between the PLL's. In addition, the values could be chosen to prohibit one or more frequencies from falling into a particular band of frequencies. The process then passes to block 124 which depicts the printing of another reference page with rulers and PEL lines in adjusted positions utilizing the ratio and alignment signal.

While a preferred embodiment has been particularly shown and described, it will be understood by those skilled in the art that various changes in form and detail may be made therein without departing from the spirit and scope of the present invention.

What is claimed is:

1. A method in an electrophotographic device having a scanning lasing system for providing an adjustable printer clock signal included within said device, said method comprising the steps of:

generating a first printer clock signal utilized for printing a first row of picture elements;

generating an alignment signal for aligning a second row of picture elements with said first row of picture elements, said second row of picture elements being moved in either a positive or a negative direction with respect to said first row of picture elements to align said second row of picture elements with said first row of picture elements; and generating a second printer clock signal utilizing said alignment signal for printing said second row of picture elements, wherein said second row of picture elements is aligned with said first row of picture elements.

2. The method according to claim 1, further comprising each of said picture elements (PELs) having a PEL width, wherein said step of generating an alignment signal further comprises the step of generating an alignment signal for moving said second row of picture elements in increments of said PEL width with respect to said first row of picture elements, said second row of picture elements being moved in said increments of said PEL width in either said positive or said negative direction with respect to said first row of picture elements.

3. The method according to claim 2, wherein said step of generating an alignment signal further comprises the step of generating an alignment signal for moving said second row of picture elements in increments of a fraction of said PEL width with respect to said first row of picture elements, said second row of picture elements being moved in said increments of said fraction of said PEL width in either said positive or said negative direction with respect to said first row of picture elements.

4. The method according to claim 3, further comprising the steps of:
   outputting a source clock signal having a source frequency;
   outputting a first clock signal having a first frequency substantially related to said source frequency by a first ratio; and
   generating said first printer clock signal utilizing said first clock signal, said first clock signal having a first printer frequency substantially related to said source frequency by a second ratio.

5. The method according to claim 4, further comprising the steps of:
   outputting said first printer clock signal utilizing a first printer output circuitry; and
   determining a value for said first ratio and a value for said second ratio to reduce jitter in said first printer output circuitry.

6. The method according to claim 5, further comprising the step of generating said second printer clock signal utilizing said first clock signal and said alignment signal, said second clock signal having a second printer frequency substantially related to said source frequency by said second ratio.

7. The method according to claim 6, further comprising the step of outputting said second printer clock signal utilizing a second printer output circuitry.

8. The method according to claim 7, wherein said step of outputting said first printer clock signal utilizing a first printer output circuitry further comprises the step of outputting said first printer clock signal utilizing a first phase-locked-loop means.

9. The method according to claim 8, wherein said step of outputting said second printer clock signal utilizing a second printer output circuitry further comprises the step of outputting said second printer clock signal utilizing a second phase-locked-loop means.

10. The method according to claim 9, wherein said step of outputting said first clock signal further comprises the step of outputting said first clock signal utilizing a third phase-locked-loop means.

11. The method according to claim 10, further comprising the steps of:
    generating a first indicator having an associated first position on a print receiving material;
    generating a second indicator having an associated second position on said print receiving material;
    generating a first enable signal for initiating a first scan executed utilizing a first laser beam, said first scan being synchronized by said first printer clock;
    generating a second enable signal for initiating a second scan executed utilizing a second laser beam, said second scan being synchronized by said second printer clock, said first and second scans being executed approximately concurrently;
    determining an offset of said second position from said first position, said offset capable of being either a positive or a negative offset; and
    modifying a timing of said second printer clock by adjusting said second enable signal utilizing said offset so that said first and second positions are approximately aligned.

12. The method according to claim 11 wherein said step of determining said offset further comprises the step of determining an offset including an integer number of PELs said second position is offset from said first position, said integer number of PELs being an integer number of said PEL widths.

13. The method according to claim 12 wherein said step of determining said offset further comprises the step of determining an offset including a fractional number of PELs said second position is offset from said first position, said fractional number of PELs being a fraction number of said PEL widths.

14. The method according to claim 13 further comprising the step of utilizing a programmable delay line and said fractional number of PELs to delay said initiation of said second scan.

15. An electrophotographic device having a scanning lasing system for providing an adjustable printer clock signal included within said device, comprising:
    means for generating a first printer clock signal utilized for printing a first row of picture elements;
    means for generating an alignment signal for aligning a second row of picture elements with said first row of picture elements, said second row of picture elements being moved in either a positive or a negative direction with respect to said first row of picture elements to align said second row of picture elements with said first row of picture elements; and
    means for generating a second printer clock signal utilizing said alignment signal for printing said second row of picture elements, wherein said second row of picture elements is aligned with said first row of picture elements.

16. The device according to claim 15, further comprising each of said picture elements (PELs) having a PEL width, wherein said means for generating an alignment signal further comprises means for generating an alignment signal for moving said second row of picture elements in increments of said PEL width with respect to said first row of picture elements, said second row of picture elements being moved in said increments of said PEL width in either said positive or said negative direction with respect to said first row of picture elements.

17. The device according to claim 16, wherein said means for generating an alignment signal further comprises means for generating an alignment signal for moving said second row of picture elements in increments of a fraction of said PEL width with respect to said first row of picture elements, said second row of picture elements being moved in said increments of said fraction of said PEL width in either said positive or said negative direction with respect to said first row of picture elements.

18. The device according to claim 17, further comprising:
    means for outputting a source clock signal having a source frequency;
    means for outputting a first clock signal having a first frequency substantially related to said source frequency by a first ratio; and wherein said means for generating said first printer clock signal utilizing said first clock signal includes said first printer clock signal having a first printer frequency substantially related to said source frequency by a second ratio.

19. The device according to claim 18, further comprising:

a first printer output circuitry for outputting said first printer clock signal; and means for determining a value for said first ratio and a value for said second ratio to reduce jitter in said first printer output circuitry.

20. The device according to claim 19, wherein said means for generating said second printer clock signal utilizing said first clock signal and said alignment signal further comprises said second clock signal having a second printer frequency substantially related to said source frequency by said second ratio.

21. The device according to claim 20, further comprising a second printer output circuitry for outputting said second printer clock signal.

22. The device according to claim 21, wherein said means for outputting said first printer clock signal utilizing a first printer output circuitry further comprises means for outputting said first printer clock signal utilizing a first phase-locked-loop means.

23. The device according to claim 22, wherein said means for outputting said second printer clock signal utilizing a second printer output circuitry further comprises means for outputting said second printer clock signal utilizing a second phase-locked-loop means.

24. The device according to claim 23, wherein said means for outputting said first clock signal further comprises means for outputting said first clock signal utilizing a third phase-locked-loop means.

25. The device according to claim 24, further comprising:

means for generating a first indicator having an associated first position on a print receiving material;

means for generating a second indicator having an associated second position on said print receiving material;

means for generating a first enable signal for initiating a first scan executed utilizing a first laser beam, said first scan being synchronized by said first printer clock;

means for generating a second enable signal for initiating a second scan executed utilizing a second laser beam, said second scan being synchronized by said second printer clock, said first and second scans being executed approximately concurrently;

means for determining an offset of said second position from said first position, said offset capable of being either a positive or a negative offset; and means for modifying a timing of said second printer clock by adjusting said second enable signal utilizing said offset so that said first and second positions are approximately aligned.

26. The device according to claim 25 wherein said means for determining said offset further comprises means for determining an offset including an integer number of PELs said second position is offset from said first position, said integer number of PELs being an integer number of said PEL widths.

27. The device according to claim 26 wherein said means for determining said offset further comprises means for determining an offset including a fractional number of PELs said second position is offset from said first position, said fractional number of PELs being a fractional number of said PEL widths.

28. The device according to claim 27 further comprising means for utilizing a programmable delay line and said fractional number of PELs to delay said initiation of said second scan.

* * * * *